United States Patent [19]

Collins

[11] Patent Number: 4,643,162

[45] Date of Patent: Feb. 17, 1987

[54] BARBEQUE SMOKER

[76] Inventor: Walter Collins, 8957 Autumnwood Dr., Sacramento, Calif. 95826

[21] Appl. No.: 771,704

[22] Filed: Sep. 3, 1985

[51] Int. Cl.$^4$ .............................................. F24C 3/04
[52] U.S. Cl. ............................... 126/41 R; 126/41 D; 126/19 R; 99/480; 99/482
[58] Field of Search ............... 126/41 R, 41 D, 41 E, 126/25 R, 19 R; 99/481, 480, 482

[56] References Cited

U.S. PATENT DOCUMENTS

| 2,004,024 | 6/1935 | Van Voorst | 99/480 |
| 2,338,156 | 1/1944 | Allen | 99/480 |
| 2,833,201 | 5/1958 | Simank | 126/25 R |
| 2,842,043 | 7/1958 | Reuland | 126/25 R |
| 3,638,635 | 2/1972 | Drennan | 126/41 R |
| 4,094,295 | 6/1978 | Boswell et al. | 126/25 R |
| 4,334,462 | 6/1982 | Hefling | 126/41 R |
| 4,554,864 | 11/1985 | Smith et al. | 126/25 R |

Primary Examiner—Carroll B. Dority, Jr.
Attorney, Agent, or Firm—Leonard Bloom

[57] ABSTRACT

A barbeque smoker housing having an interior provided with food holders therein, a bottom portion of the housing having a perforate wall which admits combustion air therebeyond, and a heat source, and a control for altering the rate at which the food cooks disposed at upper and lower portions of the housing.

1 Claim, 11 Drawing Figures

BARBEQUE SMOKER

FIELD OF THE INVENTION

The following invention relates generally to an apparatus for cooking comestibles such as meat. More particularly, the invention relates to a smoker for slow cooking meats such as poultry, pork, beef, and fish.

BACKGROUND OF THE INVENTION

The use of smokers for curing meat has existed, perhaps, as long as civilization has used fire to cook meat. In the more recent past, various structures have been devised to simultaneously provide control over both the cooking fire, so as to control the cooking rate, and also over the smoke expelled to provide back-pressure control. Smoke from the coals and the meat drippings flavor the meat with a smoky flavor and brown color that many people associate with properly cooked meat.

Many of the known prior art devices have drawbacks which include the inability to control the rate at which the fire burns precisely, the inability to control the rate at which the smoke passes from within the cooker to the outside environment, and the means by which the temperature at which the meat can be cooked can be controlled. Maintenance, such as cleaning these cookers and removing ashes that build up as a function of time, have also made some cooker styles less desireable than others.

The instant invention is distinguished over the known prior art in that a cooking instrumentality has been provided which is formed as an enclosure, having an openable front wall, allowing communication to the interior of the enclosure, along with appropriate support shelves and rods to place the meat to be cooked at a desired height with respect to the charcoal or wood being used for precision cooking. A container is disposed at a bottom portion of the interior, adapted to receive therewithin charcoal or wood, which in turn imparts a characteristic flavor to the meat being cooked. Immediately underlying the container which holds with wood or charcoal, a burner is provided not only to facilitate lighting the charcoal or wood, but also to control the temperature at which the fire burns during the course of the cooking process. Various instrumentalities are provided on upper portions of the enclosure to monitor the temperature at which the meat is being cooked and to control this temperature by constricting the rate at which built-up smoke egresses from the interior of the enclosure. In this manner, the varied requirements which change as a function of the meat being cooked can be taken into consideration so that the cooked meat has the desired properties of tenderness, succulence, etc.

SUMMARY AND OBJECTS OF THE INVENTION

Accordingly, this invention has as its objective, the provisions of a new and novel barbeque smoker.

A further object of this invention contemplates providing a device as characterized above, which is extremely durable in construction, relatively inexpensive to manufacture, and lends itself to mass production techniques.

It is the further object of this invention to provide a device as characterized above, which is extremely safe to use.

A further object of this invention contemplates providing a cooker as defined above, in which the variables of temperature and time can be controlled accurately and with a minimal effort.

It is yet another object of this invention to provide a device as characterized above, wherein successive loads of food can be introduced into the cooker with minimal down time for recharging the charcoal or wood being used.

It is the further object of this invention to provide a device as characterized above, which is so constructed that either relatively large or small portions of meat can be cooked in an economical fashion.

It is the further object of this invention to provide a device for curing an article embodied as a housing having an interior provided with support food holders therein, a bottom portion of the housing being a perforate wall which admits combustion air therebeyond and a heat source, and a sensor for gauging characteristics within said housing interior without opening the housing and altering the characteristics measured.

These and other objects will be made manifest when considering the following detailed specification taken in conjunction with the appended drawing figures.

BRIEF DESCRIPTION OF THE DRAWING FIGURES

BRIEF DESCRIPTION OF THE PREFERRED EMBODIMENT

Figure 1:
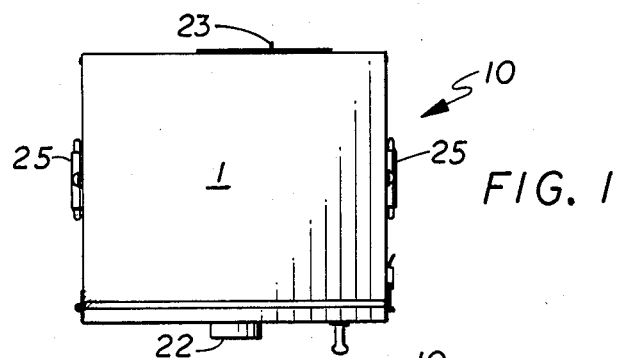
FIG. 1 is a top plan view of the apparatus according to the present invention.

Referring to the drawings now, wherein like reference numerals refer to like parts throughout the various drawing figures, reference numeral 10 is directed to the barbeque smoker according to the present invention.

As shown generally in FIGS. 1 through 7, the housing 10 is formed as a substantially rectangular hollow, having an interior formed by a top wall 1, a pair of spaced, parallel side walls 2, 3, and a rear wall 4, extending between the top wall and the side walls. A front wall 5 is formed as a door having hinges 6 placed adjacent one side wall 2 and the front door 5. A bottom wall 7 is provided with perforations 8 to complete the interior. The purpose of the perforations is to allow air at a controlled rate for purposes to be assigned later.

Figure 5:
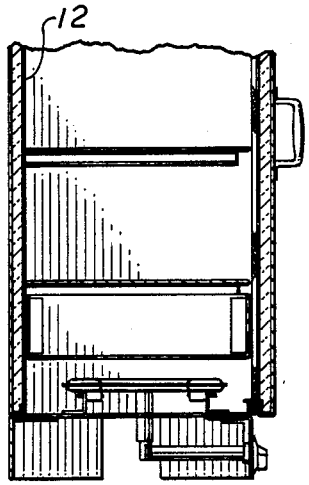
FIG. 5 is a sectional view taken along lines V—V of FIG. 3.

As shown in FIG. 5, the walls defining the interior may be of double wall construction having insulation 12 between the double walls or alternatively, the walls may be single ply. Clearly, with double wall construction provided with insulation 12, heat retention properties of the cooker are improved. Also, however, the exterior temperature of the cooker will be somewhat less than the temperature of the interior.

Figures 2, 3, 4:
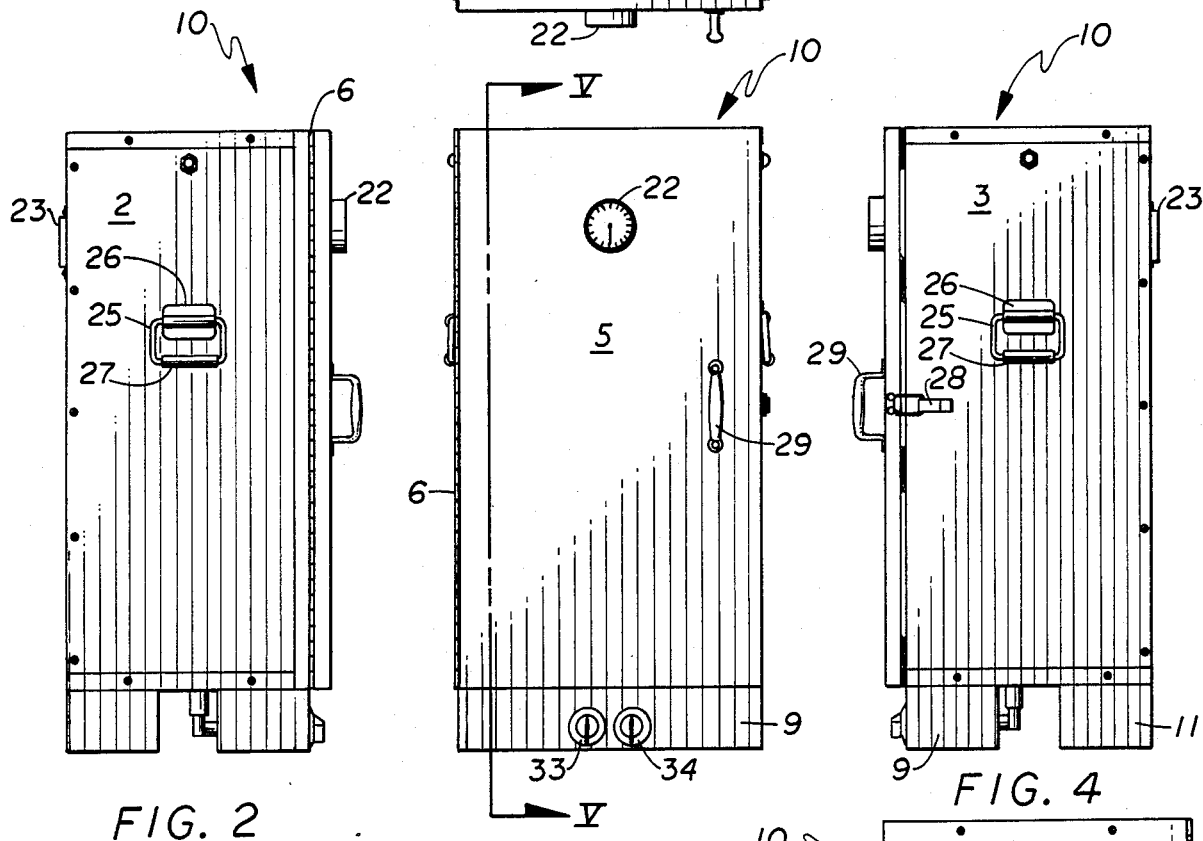
FIG. 2 is a side view thereof.
FIG. 3 is a front view of that which is shown in FIGS. 1 and 2.
FIG. 4 is a side view opposite from that which is shown in FIG. 2.
Figure 7:
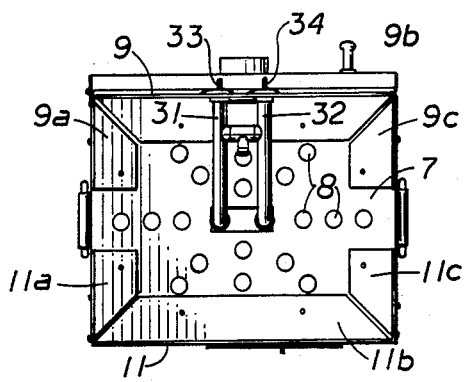
FIG. 7 is a bottom view thereof.
Figure 6:
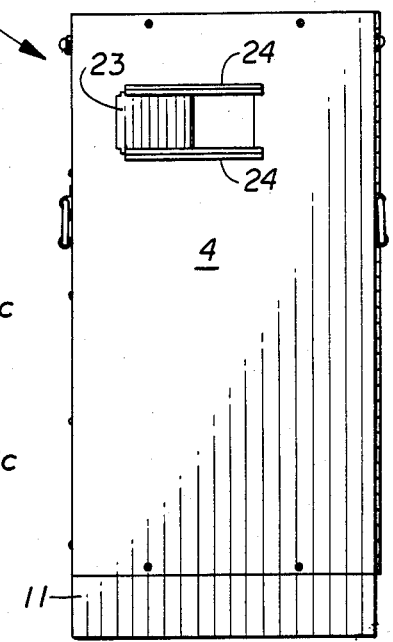
FIG. 6 is a a rear view of that which is shown in FIGS. 1, 2, 3, and 4.
Figure 9:
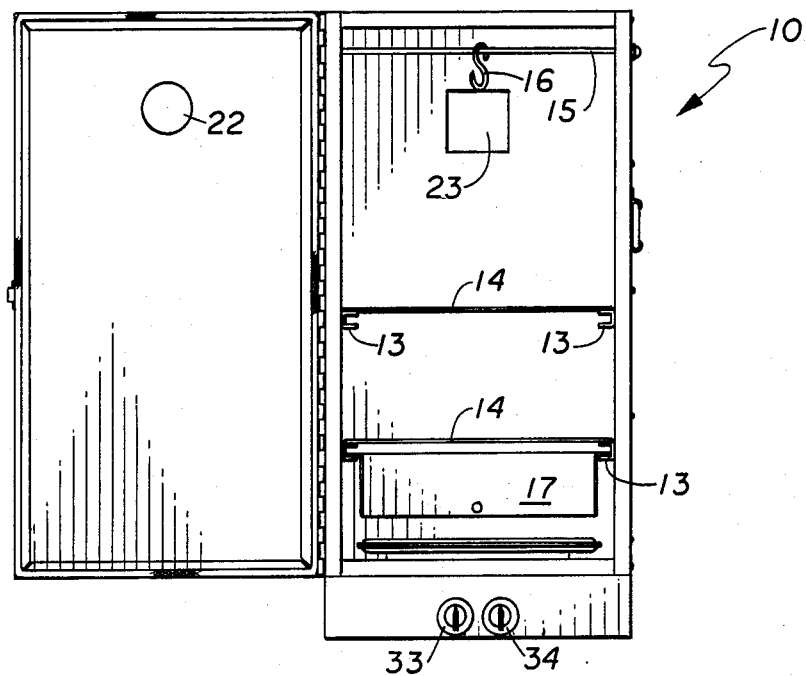
FIG. 9 is a front view, similar to that which is shown in FIG. 3 with the door open exposing the interior of the smoker.
Figure 10:
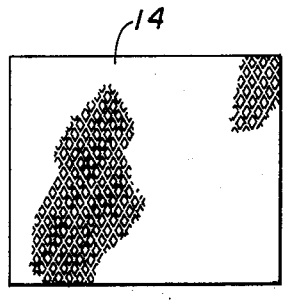
FIG. 10 is a top plan view of one of the meat racks according to the present invention.
Figure 11:
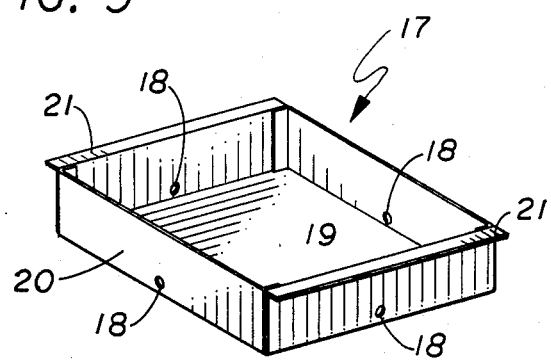
FIG. 11 is a perspective view of a tray to be used within the interior of the cooker, to hold charcoal or wood.

The cooker smoker 10 is supported upon a base having a front section 9 and a rear section 11, each of which is substantially "C" shaped in section. As shown in FIG. 7 for example, folded panels are provided for additional stability when supporting the cooker on the floor and these folded panels are formed by bending portions of the front base section 9 to provide flaps 9a, 9b, and 9c, adapted to be placed immediately adjacent to the supporting surface upon which the cooker is to be placed. Similarly, the rear base section 11 has folded over portions 11a, 11b, and 11c for similar purposes. As shown in FIGS. 2 and 4, access is provided to the interior defined as the space below the bottom wall 7 and the supporting bases so that access can be had to the burner control element and its associated piping to be described.

Figure 8:
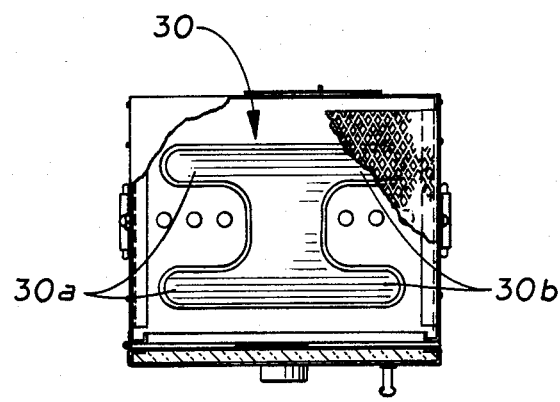
FIG. 8 is a top plan view, similar to FIG. 1 with certain of the walls and trays partially removed to show the burner element.

More particularly, first and second control elements 33 and 34 control the rate at which gas is provided through conduits 31 and 32 ultimately to the burner 30 of FIG. 8. The source of the cooking gas and its associated conduit is not shown. The burner 30 is of substantially "H"-shaped configuration which actually includes two burner elements 30a and 30b interconnected along the medial portion of the "H". Thus, by controlling either or both of the controls 33, 34, either or both burner elements can be utilized in cooking the meat contained within the interior of the housing. Each burner provides a flame extending upwardly into the interior of the housing along the outer periphery of the "H"-shaped burner.

Heat is directed to an open topped container 17 disposed immediately above the burners 30a, b. For this purpose, a pair of "C"-shaped channel members 13 are attached to interior portions of both side walls 2, 3 in the same horizontal plane, and the tray 17 is slideably disposed and supported within the channel members. For this purpose, first and second lips 21 are provided on the tray which is formed with a bottom wall portion, upwardly extending side walls 20, two of which communicate with the lips 21 so that the tray can be supported in the channel members 13. A plurality of passageways 18 are provided through the container to allow communication of air into its interior since this container is adapted to support wood or charcoal or both. Thus, the charcoal or wood would have adequate air to breath and support combustion. When this tray is to be used for wood or charcoal, and once ignition has been established, the burner 30 can be put on an exceedingly low temperature or turned off entirely.

Immediately above the tray 17, a meat rack 14 of substantially lathe-like configuration and formed from metal, is provided on top portions of the "C"-shaped channel members 13. Vertically spaced from this first meat rack 14, a second meat rack 14 is provided similarly supported on channel members 13 carried on side walls of the housing so that more meat can be cooked at one time. Clearly, depending upon the type of meat cooked, a plurality of such meat racks can be provided. In addition, at least one meat rod 15 is placed adjacent a top portion of the interior of the cooker, and supported between side walls 2 and 3 by nuts extending on threaded ends of the meat rod 15. Substantially "S"-shaped meat hooks 16 are carried on the meat rod to support meat in depending relation therefrom within the interior of the housing so that a variety of different effects can be evidenced in using the cooker in this manner. For example, spareribs can be hung from the meat hook. Poultry, such as a turkey, can be placed on one of the meat racks below the rod 15 so that as the spareribs cook, fat dripping therefrom will automatically baste the turkey placed below the pork.

In addition to the heat controls 33 and 34, a damper 23 is provided on an upper portion of the back wall 4 of the cooker. The damper includes a sliding plate 23 supported on upper and lower tracks 24, to selectively occlude the magnitude of an opening passing through the back wall of the housing thereby controlling the rate at which smoke from the cooker is exhausted. This control provides requisite back pressure and effectively controls the rate at which the charcoal will burn and the degree to which the meat will have imparted thereon the barbeque smoke flavor.

The front door 5 of the housing is provided with a sensor 22 for monitoring conditions within the interior of the housing. In one form of the invention, this sensor is a thermometer so that the requisite interior temperature can be determined and maintained without opening the door which would alter the interior temperature.

Note the presence of the handle 29 on the door 5 and latch 28 which secures the door in a closed position. In addition, hardware is mounted on the exterior side walls 2 and 3 to facilitate transporting the cooker if desired. To this end, a clamp 26 fixed to the side walls 2 and 3 support handles 27 attached to the clamps 26 through rods 25 so that the device can be moved from one location to another. It is clear that this device lends itself to portability, and if desired the device can be placed on wheels (not shown).

Having thus described the invention, it should be apparent that numerous structural modifications are contemplated as being a part of this invention as set forth herein above and defined herein below by the claims.

I claim:

1. A barbeque smoker comprising in combination:
   a housing having an interior provided with means to support food holders therein,
   a bottom portion of said housing having a perforate wall which admits combustion air therebeyond, and a heat source, and
   a sensor for gauging characteristics within said housing interior without opening said housing and altering the characteristics measured;
   wherein said housing is formed as a rectangular hollow having a top wall, a perforate bottom wall, a pair of spaced, parallel opposed side walls and a back wall interconnecting to top, bottom and side walls, and a front door, hinged to one side wall;
   wherein said housing is supported on a base formed from first and second vertically extending base members having folded portions for stability, said folded portions including a side portion and a front portion;
   wherein said heat source includes a burner of substantially "H"-shaped configuration having first and second portions and further having first and second cooking controls associated respectively with said first and second portions of said burner, said controls extending to an exterior face of said housing allowing access thereat; and a tray carried within said housing interior above said burner and supported on channel members carried on interior side walls of said housing, said tray having a bottom wall and four upwardly extending side walls including two ledges extending from two opposed said side walls formed as lips adapted to ride within said channel members;

said tray having passageways for air and adapted to contain wood for flavoring and cooking the meat;

wherein a further pair of channel members is spaced upwardly from said first named channel members and adapted to carry a metallic lathe-like meat rack shelf thereon;

a meat supporting rod extending between side walls of said housing interior fastened thereto by means of nuts on threaded extremeties of said meat support rod, a slidable damper disposed on a back wall of said housing, said damper carried on said upper portion to provide back-pressure and therefore control the residence time of smoke within said interior, by upper and lower trackways, first and second handle members disposed on exterior faces of said side walls, a handle on said front wall defining a door, and a latch mechanism associated therewith for latching said door in a closed position.

* * * * *